April 1, 1952 — L. L. LITTLEJOHN ET AL — 2,591,272
WATER INJECTING SYSTEM FOR INTERNAL-COMBUSTION ENGINES
Filed June 23, 1947 — 2 SHEETS—SHEET 1
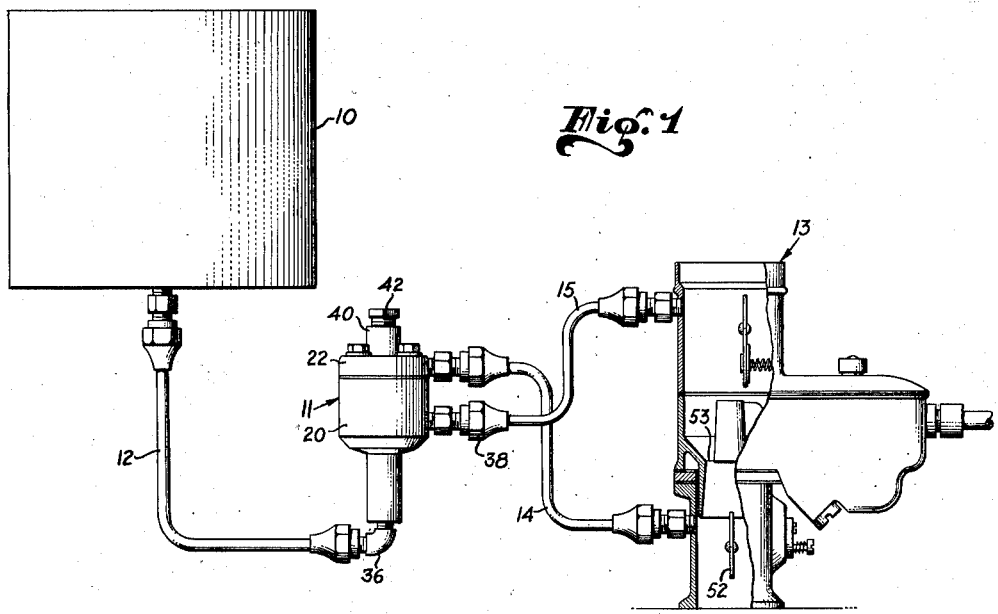
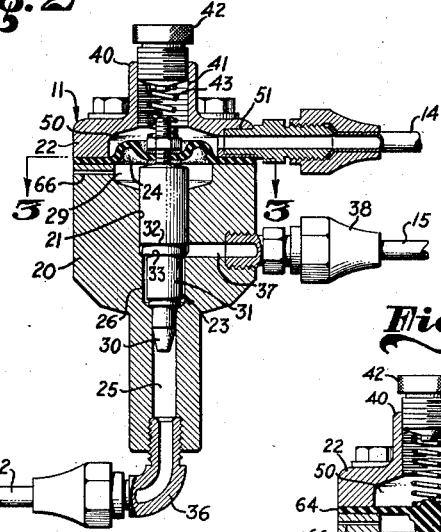
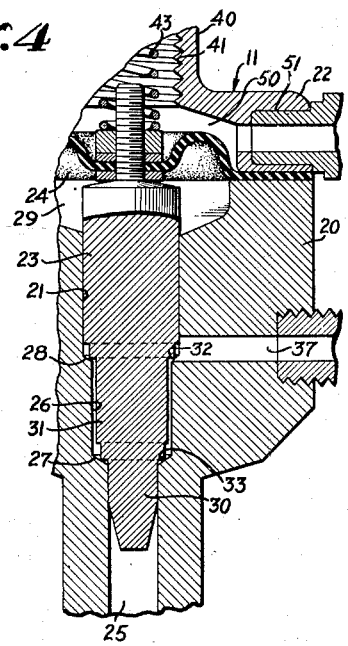
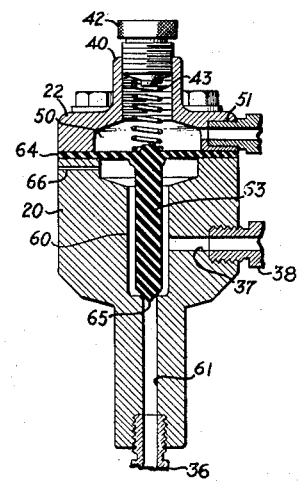
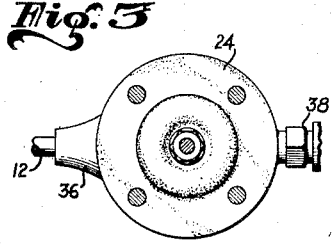
INVENTORS:
LYMAN L. LITTLEJOHN.
JOHN C. GULLETT.
BY Huebner, Malaby and Beehler
ATTORNEYS April 1, 1952 L. L. LITTLEJOHN ET AL 2,591,272
WATER INJECTING SYSTEM FOR INTERNAL-COMBUSTION ENGINES
Filed June 23, 1947 2 SHEETS—SHEET 2

INVENTORS:
LYMAN L. LITTLEJOHN.
JOHN. C. GULLETT.
BY
ATTORNEYS.

Patented Apr. 1, 1952

2,591,272

UNITED STATES PATENT OFFICE 2,591,272

WATER INJECTING SYSTEM FOR INTERNAL-COMBUSTION ENGINES

Lyman L. Littlejohn, Glendale, and John C. Gullett, Arbuckle, Calif.

Application June 23, 1947, Serial No. 756,372

2 Claims. (Cl. 123—25)

Our invention relates to a water injecting system adapted for the introduction of a metered supply of water into the combustion chamber of an internal combustion engine in conjunction with fuel to be used in said engine.

It has long been known that the introduction of small amounts of water or water vapor into the fuel to be consumed in an internal combustion engine is highly beneficial to both the performance and the life of the engine.

It is an object of our invention to provide a control means for metering water into the fuel intake system of an internal combustion engine so that lower grades of fuels, such as lower octane gasolines, can be used in high compression engines without obtaining any pre-ignition and detonation.

Numerous attempts have been made to provide such a system for introducing water or water vapor into the fuel intake system. Some of the previous attempts involved the use of a water supply system leading into either the carburetor or intake manifold and having a valve interposed in the water system, which said valve also controlled the vacuum created by the intake manifold. The principal weakness and difficulty with such prior art systems has been in the fact that the source of vacuum or low pressure was taken from the wrong part of the fuel injection system.

It is well known that a substantial low pressure differential with respect to atmospheric pressure can be obtained from the intake manifold of an internal combustion engine. It is also well known that the pressure differential fluctuates considerably with the operating conditions of the motor. For example, when the motor is turning at high speeds and the butterfly valve controlling the fuel injection from the carburetor, which is mechanically controlled, is closed a relatively large pressure differential or vacuum head is obtainable from the intake manifold. In the event that such pressure differential is used to control the water metering valve, it becomes readily apparent that the valve will be opened too far and water in sufficient volume will be introduced into the fuel system to prevent proper ignition.

It is a further object of our invention to provide an injecting system having a water metering valve which is controlled by a source of low pressure which is substantially uniformly coordinated with the desired operating conditions.

The prior attempts to introduce water or moisture into the intake system of an internal combustion engine have usually met with failure because it was not understood how to coordinate the proper flow of water with the full demands of the engine.

We have discovered that by the proper coordination between the setting of the carburetor air intake valve and a valve controlling the flow of water into the air intake that a proper balance can be maintained under all operating conditions. It is, therefore, a further object of our invention to provide a system for metering water into the fuel intake system which is at all times coordinated with or responsive to the setting of the carburetor air intake valve.

Other and further objects and advantages of our invention will become apparent from the drawings and the specifications relative thereto.

In the drawings:

Figure 1 is a schematic diagram of a water metering system embodying our invention.

Figure 2 is an elevational view in section of the water metering valve.

Figure 3 is a section taken on line 3—3 of Figure 2.

Figure 4 is an enlarged fragmentary section of the control valve shown in Figure 2.

Figure 5 shows a modification of the valve shown in Figure 2.

Figure 6:
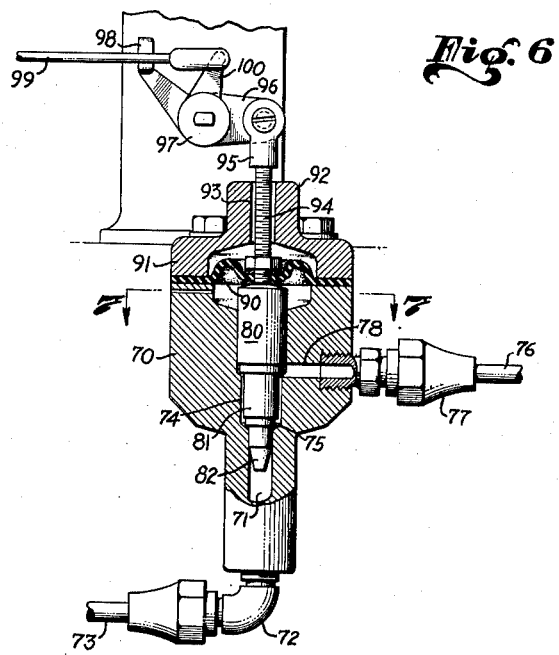
Figure 6 illustrates a further modification embodying the principles of our invention.

Referring to Figure 1, the water injecting system comprises essentially a water supply tank 10, a metering control valve 11 connected to the tank 10 by conduit 12, a standard carburetor 13 which is connected to the control valve 11 by means of a control conduit 14, and a supply conduit 15.

The details of the valve 11 are shown in Figures 2, 3 and 4. The valve 11 is formed with a body 20 having an axial bore 21, a cap 22, a valve stem 23 disposed in the bore 21, and a diaphragm 24 disposed between the cap 22 and the body 20 and securely fastened to the stem 23 and adapted to actuate the stem 23. The bore 21 is formed with a reduced lower portion 25, a slightly larger middle section 26, shoulders 27 and 28, and a high pressure chamber 29. The valve stem 23 has a reduced end portion 30, a slightly larger center section 31 and shoulders 32 and 33. The reduced lower portion 30 is adapted to fit snugly in sealing engagement with the reduced bore 25 to prevent the flow of water through the bore 25 until the valve stem 23 has been raised sufficiently far to form an opening between the valve stem 23 and the bore 25.

The conduit 12 connecting the valve 11 to the water tank 10 is connected to the lower end of bore 25 by means of any standard coupling, such as the union nut 36, and acts as an inlet for the valve 11. The water supply line 15 is connected to a radial bore 37 by means of a standard union nut 38. The radial bore 37 communicates with the bore 25.

The cap 22 is formed with an axially disposed boss 40 having a bore 41 therethrough which is threaded to receive an adjusting screw 42. The adjusting screw 42 abuts against and controls the tension of a compression spring 43. The other end of the compression spring 43 abuts against the top of the valve 23. The cap 22 is provided with a low pressure or vacuum chamber 50 which communicates with a low pressure source of the fuel intake system by means of a line 14 and a radially disposed bore 51.

A vacuum control line 14 is connected to the carburetor 13 at a point between the butterfly valve 52 and the venturi throat 53, thereby assuring a vacuum which is substantially uniform with respect to the fuel demands of the engine.

It will readily be seen that the source of vacuum is substantially constant with respect to the fuel demands because fuel demands are controlled by the pressure throat of the venturi 53 and the butterfly valve 52.

As will be readily understood the degree of vacuum required to raise the valve 23 into position to where water will flow from the tank 10 into the carburetor 13 can be predetermined and preset by means of the adjusting screw 42 of the compression spring 43. It is usually preferred to so adjust the tension of the spring 43 that no water will be introduced into the fuel system while the motor is operating under low torque conditions. It will readily be understood that the operating torque conditions necessary before introducing water into the fuel system will vary with the type and make of the motor involved, and that anyone skilled in the art can easily ascertain the proper setting for the tension of the spring 43. It will also be apparent that regardless of the speed at which the motor is running the intake manifold vacuum will be transmitted to the control diaphragm 24 in direct relation to the position of the butterfly valve 52. By that is meant, during high speed operation of the motor when the butterfly valve 52 is closed; that is, when the motor is turning rapidly against compression, the relatively large vacuum head which is generated in the intake manifold cannot be transmitted to the diaphragm 24, so that when relatively small amounts of fuel are being introduced into the motor the supply of water is limited or cut off.

Figure 5 shows a modification of our invention, and in the following description parts which are similar to those shown in Figures 2, 3 and 4 are designated by the same numbers. In the modified form the body 20 is formed with axial bore 60 having a reduced portion 61 which acts as a water inlet. The control valve 63 and diaphragm 64 are molded as an integral part of some suitably flexible material, such as neoprene or rubber. The valve 63 is formed with a tapered end 65 adapted to seat against the bore 61 in sealing engagement to prevent water from flowing through the system.

It will readily be seen that when a vacuum is applied to the vacuum chamber 50 sufficient to overcome the spring 43 that the diaphragm 64 will be lifted and the tapered end 65 will become unseated from the top of the bore 61, and water will be allowed to flow through the valve to the carburetor.

The position of the diaphragms 24 and 64 will be regulated by the differential of pressure against the opposing surfaces. It will readily be seen that as the diaphragms 24 and 64 are raised, the volume of the high pressure chamber increases, and unless some means is provided to allow the introduction of additional quantities of air into this chamber, an increasingly higher vacuum increment must be produced by the intake manifold to create a given pressure differential increment. Such relief means may be provided by an equalizing orifice 66 which communicates between the high pressure chamber 29 and the atmosphere. It has, however, been found that essentially satisfactory performance can be obtained without the use of the equalizing orifice 66.

It will also be apparent to those skilled in the art that operation of an internal combustion engine at higher altitudes requires a wider setting of the butterfly valve 52 to obtain a given quantity of air and that the communication of the reduced pressure in the line 14 caused by the wider setting, together with the reduced atmospheric pressure, would result in a greater relative displacement of the diaphragms 24 and 64, if the pressure in the high pressure chamber remained constant. The relief orifice 66, which communicates with the atmosphere, equalizes the effect of reduced atmospheric pressure due to high altitude operation, thereby automatically regulating the water metering valve for any given altitude operation.

It will readily be apparent that our invention is not limited to a construction using the diaphragm 24. Any means for raising the valve 23 which is responsive to a pressure differential, such as, for example, a piston, or an expandable bellows, should be considered as an equivalent of the diaphragms 24 and 64 within the scope of the valves just described.

A thorough understanding of our invention reveals that we have provided a water metering valve for automatically regulating the amounts of water introduced into the fuel mixture of an internal combustion engine, which is responsive to, and coordinated with the carburetor setting. By this is meant, when the butterfly valve 52 is in an open position, the valve 23 will be raised to a full open position so that additional quantities of water may be introduced into the carburetor. Stated another way, the water being introduced into the carburetor will be directly proportioned to the quantity of fuel being consumed by the engine, thereby maintaining a proper balance ratio at all times.

This has been accomplished by the forms shown in Figures 1 to 5, inclusive, by means of a pneumatic control line connected to a point in the carburetor between the throat of the venturi 53 and the butterfly valve 52. It is clear when the valve 52 is closed, either partially or fully, that any vacuum which may exist in the intake manifold will not be communicated back to the line 14.

Figure 7:
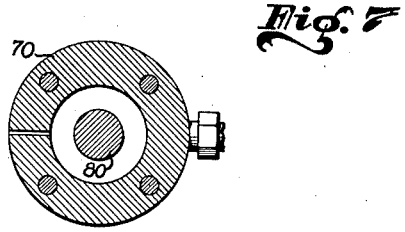
Figure 7 is a sectional view taken on line 7—7 of Figure 6.

This same purpose; that is, coordinating the quantity of water with the quantity of fuel consumed, can also be accomplished by mechanical means. Figures 6 and 7 show another form embodying the principles of our invention wherein the valve for metering water is controlled by a mechanical linkage between the foot throttle and the water metering valve, so that when the carburetor quadrant is in full open position the water metering valve will also be fully opened.

Referring more specifically to Figure 6, we have provided a valve body, designated generally 70.

having a longitudinal bore 71 adapted to receive a threaded fitting 72 for connection to the water supply system by means of a conduit 73. The bore 71 communicates with a bore 74 which has a substantially larger diameter and which is connected to the bore 71 by means of a valve seat 75. The bore 74 communicates with a carburetor at a point above the choke by means of a conduit 76, universal fitting 77, and a bore 78.

A valve stem 80 having a reduced central portion 81 and a reduced and tapered end portion 82 is disposed in the bores 71 and 74. The reduced central portion 81 is larger than the bore 71 but smaller than the bore 74, thereby defining an annular passage between the bore 74 and the reduced central portion 81. The reduced and tapered end portion 82 is adapted to fit in water-sealing engagement into the bore 71 so that when the valve stem 80 is in its lowermost passage, water cannot flow from the conduit 73 to the conduit 76. However, when the valve 80 is in its raised position, a free water passage is created from the conduit 73 to the conduit 76 through the bores 71, 74 and 78.

The valve stem 80 is mounted in the valve body 70 by means of a flexible water seal 90 which is disposed between the valve body 70 and a valve cap 91. The valve cap 91 is formed with a centrally disposed axial boss 92. The boss 92 is formed with a bore 93 longitudinally therethrough adapted to receive a rod 94 which is securely attached to the valve stem 80. A yoke 95 is adjustably secured to the end of the shaft 94 and pivotally connected to a lever 96.

The lever 96 is pivotally mounted on a shaft 97 adapted to hold and operate the butterfly valve 52, and is formed with a stop 98 adapted to be engaged by a rod 99 which is adapted to operate the carburetor quadrant 100.

In the operation of our invention, as embodied in Figure 6, the valve stem 80 remains in its lowermost position effectively preventing the flow of water into the carburetor until the carburetor control rod 99 has been moved sufficiently to the left to engage the stop 98. It is preferred to have this delay in opening the valve because it is not desired to have water introduced into the fuel system while the engine is operating under relatively low torque conditions.

When the carburetor control rod 99 has moved sufficiently to the left to cause the engine to operate under high torque conditions, the pilot 96 is caused to rotate counter-clockwise, thereby raising the valve stem 80 and creating a measured opening for the passage of water from the conduit 73 to the conduit 76. It will readily be seen that as the carburetor is opened wider, the valve stem 80 will be raised higher and the passage for water will become freer so that the supply of water is at all times coordinated with the amount of fuel being consumed.

It will also be apparent that during the operation of such internal combustion engines as are installed in modern passenger cars, under conditions of high speed coasting the throttle will be closed and, therefore, no water will be introduced into the system. By high speed coasting is meant those conditions under which the vehicle is traveling at high velocities against the compression of the motor.

It will be understood that our invention relates to a system for controlling the injection of water into the carburetor air stream in a manner which will at all times be commensurate with the full demands and not in the specific embodiment shown. Our invention is capable of being incorporated in a great variety of physical forms which will still incorporate all of the principles thereof.

It should be apparent that instead of a separate water metering valve adapted to be attached to the carburetor as an auxiliary part, it could be built into the carburetor as an integral part thereof and controlled either by the throttle setting or by means of Venturi pressure or mechanical linkage. Such a construction is contemplated as within the scope of our invention.

Having described our invention, what we claim as new and desire to secure by Letters Patent is:

1. A metering device for controlling the injection of water into a carburetor having an air intake, a valve for controlling the intake of air and a venturi disposed between said air intake and said carburetor valve, said metering device having an inlet and a discharge and a valve interposed between said inlet and discharge, a high pressure and a low pressure chamber and a diaphragm interposed between said chambers and adapted upon changes of pressure differential to control said valve, and a conduit pneumatically connecting said low pressure chamber to said carburetor at a point between said venturi and air intake control valve.

2. In a means for injecting water into a carburetor of an internal combustion engine, said carburetor having an air intake passage, a valve for controlling the intake of air and a venturi disposed between said intake and said valve, said means comprising a supply of water, a conduit connecting said water supply to the intake of said carburetor, the improvement comprising a metering valve having a body formed with an inlet and an outlet and a passage communicating therebetween, a valve stem disposed between said inlet and outlet and adapted to control the flow of water therethrough, a high pressure and a low pressure chamber and a diaphragm disposed therebetween, responsive to pressure differentials and adapted to control the position of said valve stem, said metering valve being interposed in said conduit between said carburetor intake and said water supply, and means to coordinate the setting of said metering valve with the setting of the air intake valve, whereby the water injected into the carburetor increases or decreases with fuel consumption, said means comprising a conduit pneumatically connecting said low pressure chamber to the air intake of said carburetor between the venturi and the carburetor control valve.

LYMAN L. LITTLEJOHN.
JOHN C. GULLETT.

REFERENCES CITED

The following references are of record in the file of this patent:

UNITED STATES PATENTS

| Number | Name | Date |
|---|---|---|
| 1,209,901 | Stevens | Dec. 26, 1916 |
| 1,236,267 | Clark et al. | Aug. 7, 1917 |
| 1,338,993 | McNeel | May 4, 1920 |
| 1,467,333 | Riege | Sept. 11, 1923 |
| 1,483,286 | DeLaMater | Feb. 12, 1924 |
| 1,756,781 | Bergougnoux | Apr. 29, 1930 |
| 2,431,679 | Adair | Dec. 2, 1947 |